(12) United States Patent
Hough et al.

(10) Patent No.: US 6,464,268 B1
(45) Date of Patent: Oct. 15, 2002

(54) HIGH STRENGTH RADIAL FLANGE COUPLING

(75) Inventors: Walter James Hough, Johns Island; Raymond L. Burnett, Isle of Palms, both of SC (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 09/617,096

(22) Filed: Jul. 14, 2000

(51) Int. Cl.[7] ................................................ F16L 19/00
(52) U.S. Cl. ...................................................... 285/367
(58) Field of Search ........................... 285/367, 24, 112, 285/419, 365, 366, 408, 409, 410, 420, 373, 364, 368; 24/285, 279, 284; D8/396

(56) References Cited

U.S. PATENT DOCUMENTS

| | | | | |
|---|---|---|---|---|
| 1,187,430 A | * | 6/1916 | Kenly | 24/275 |
| 1,442,909 A | | 1/1923 | Ryan | |
| 2,417,741 A | * | 3/1947 | Dillon | 138/99 |
| 2,561,635 A | * | 7/1951 | Prochaska | 24/283 |
| 3,014,259 A | * | 12/1961 | Joseph | 24/284 |
| 4,958,419 A | * | 9/1990 | Heckethorn et al. | 24/275 |
| 5,018,768 A | * | 5/1991 | Palatchy | 24/284 |
| 5,056,196 A | * | 10/1991 | van Walraven | 24/279 |
| 5,509,702 A | | 4/1996 | Warehime et al. | |
| 5,570,499 A | | 11/1996 | Katayama et al. | |
| 5,653,481 A | | 8/1997 | Alderman | |
| 6,062,610 A | * | 5/2000 | Andersson et al. | 285/367 |

FOREIGN PATENT DOCUMENTS

CH 285561 1/1953

* cited by examiner

*Primary Examiner*—Christopher P. Schwartz
*Assistant Examiner*—Melanie Torres
(74) *Attorney, Agent, or Firm*—Nixon Peabody LLP; Charles M. Leedom, Jr.

(57) ABSTRACT

A radial flange coupling for joining a turbo-charger unit end housing to a turbo-charger center (or bearing) housing and for joining a turbine housing to an exhaust outlet connection including first and second arcuate jaws containing first and second radially inwardly opening grooves for clamping together flanged elements as the jaws are moved from an open to closed position wherein the jaws are hingedly joined by a connection that includes an extension integrally formed at the end of one jaw and extends through an opening in the other jaw and back to the first jaw where the distal end of the extension is affixed to the one jaw. The other ends of the jaws include end projections. One projection includes a threaded nut permanently affixed thereto. A threaded bolt having a reduced diameter pilot is provided for self piloting during assembly.

16 Claims, 6 Drawing Sheets

FIG. 11
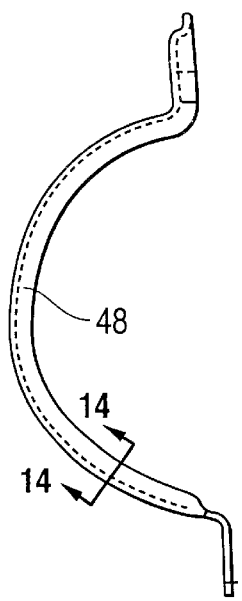
FIG. 12
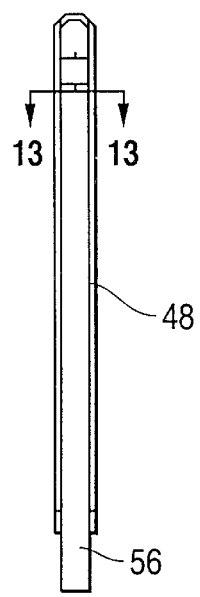
FIG. 14    FIG. 13
    
FIG. 17
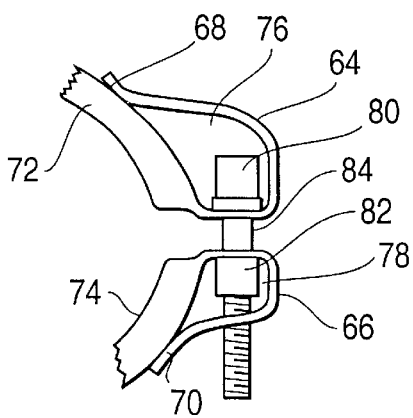
FIG. 15
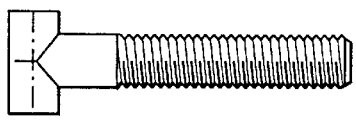
FIG. 16

HIGH STRENGTH RADIAL FLANGE COUPLING

FIELD OF THE INVENTION

This invention relates to a coupling that is suitable to join together a pair of elements having juxtaposed radial flanges including pipes, hoses, tubes or the like and is particularly suitable for joining a turbo-charger end housing to a turbo-charger center (or bearing) housing and for joining a turbine housing to an exhaust outlet connection.

DESCRIPTION OF THE RELATED ART

Couplings for joining together pipes, hoses, tubes and the like are extremely well known and can take a variety of forms. For example, the coupling illustrated in U.S. Pat. No. 1,442,909 to Ryan is designed to attach a relatively flexible hose onto a relatively stiff pipe telescopically received within the flexible hose and includes a pair of arcuate sections pivotally connected at one end. The coupling further includes a yoke type fastener for linking the opposite ends of the arcuate sections to form a closed loop that is adapted to be circumferentially reduced by means of the yoke type fastener to cause the arcuate sections to radially squeeze the flexible hose onto the pipe. While suitable for its intended purpose, this type of coupling is limited to situations where the elements being joined are telescopically arranged and the outer element is relatively flexible to permit the outer element to be squeezed onto the telescopically received element.

In many situations the elements to be joined are relatively inflexible metal tubes or assemblies that require end to end joinder of the elements either directly in abutting contact or with an intervening gasket to improve the fluid tightness of the joint. This type of end to endjoinder is particular useful in joining together elements of a turbocharger assembly such as a center (or bearing) housing to a turbine housing or the turbine housing to an exhaust outlet. Examples of these types of prior art couplings are illustrated in U.S. Pat. No. 5,509,702 to Warehime et al. and U.S. Pat. No. 5,653,481 to Alderman both of which disclose couplings that are designed to join together pipes having radial flanges adjacent the pipe ends. Each coupling is designed to impart an axial force to the radial flanges to cause the pipes to be forced together into end-to-end abutting relationship. The patent to Warehime et al. '702 discloses a pair of arcuate jaws having inwardly opening grooves for receiving the juxtaposed radial flanges of the respective pipe sections. The inner surfaces of the grooves are flared to create camming surfaces that force the pipe ends together axially as the coupling jaws are drawn together by a fastener that pulls together the free ends of the jaws. The other ends of the respective jaws are linked together by a multi-element assembly that forms two separate pivot connections for the arcuate jaws respectively. The patent to Alderman '481 discloses a similar arcuate jaw arrangement but the jaws are hingedly joined along a single pivot axis at one end and pulled together at their opposite ends by means of a bolt and nut assembly. As illustrated in FIG. 4 of the Warehime et al. '702 and FIG. 2 of the Alderman '481 patent, a seal or gasket may be placed between the respective flanged elements being joined by the clamp to assist in forming a seal.

While couplings disclosed in both Warehime et al. '702 and Alderman '481 are suitable for the purposes disclosed, these patents illustrate relatively complex (and therefor expensive) coupling structures that are not suitable, for situations were low cost is essential to achieving the desired result. U.S. Pat. No. 5,570,499 to Katayama et al. overcomes some of the problems associated with high cost and complexity in a bolt-tightened coupling for joining flanged elements together in abutting end-to-end relationship. In particular, Katayama et al. '499 discloses a coupling including a pair of jaws that includes an extension flange at one end of each jaw to form an arcuate tab extending through a connecting ring 4. This type of connection is similar to the hinge structure illustrated in the Ryan '909 patent cited above and could give rise to the possibility of failure should either arcuate tab become unbent during the tightening process. Katayama et al. '499 also discloses the concept of mounting the fastening bolt that allows limited rotation to assist during the installation process but suggests a variety of different arrangements of "projections" for engaging the shank portion of the fastening bolt. These projections provide some level of retention of the bolt but do not insure that the fastening bolt will not be lost or separated during the assembly process should the bolt be subjected to a dislodging axial force.

Swiss Patent No. 285,561 discloses a coupling having a pair of arcuate members that are rotatably joined by hinge means formed from a hook shaped extension located at one end of a member extending into an opening located at one end of the other member. The arcuate members are pulled together by means of a threaded fastener arranged to engage a pair of radial projections located at the ends of the arcuate member opposite the hinge. While useful for the purposes disclosed the coupling illustrated in this patent does not include arcuate jaws having radially inwardly opening grooves for engaging the juxtapositioned flanges of a pair of flanged elements.

SUMMARY OF THE INVENTION

An object of this invention is to provide a coupling which overcomes the deficiencies of the prior art and more particularly, a coupling for joining a pair of flanged elements which is both high in strength yet low in cost.

A more specific object of this invention is to provide a coupling for releasably joining a pair of flanged elements having juxtaposed radial flanges wherein the coupling includes first and second arcuate jaws pivotally joined by a hinge connection at one end and biased together by a jaw fastener at the other end wherein the hinge connection is formed by an extension of the second arcuate jaw and is arranged to pass through an opening in the first arcuate jaw and is curved back upon the second arcuate jaw and affixed thereto to form a closed loop pivot for the hinge connection.

Another object of this invention is to form each of the first and second arcuate jaws with an arcuate peripheral wall and a pair of radially inwardly directed side walls connected to the arcuate peripheral wall to form inwardly opening grooves wherein the side walls have inner surfaces defining the axial boundaries of the radially inwardly opening grooves. The inner surfaces are oriented to cause the axial distance separating each pair of inner surfaces to be greater at the mouth of the groove as compared with the axial distance separating the inner surfaces at the base adjacent the peripheral wall. The inner surfaces are arranged to contact the radial flanges of the flanged elements to impart the axial biasing force to the flanged elements.

Yet another object is to provide each arcuate jaw as described above with a radially outwardly extending end projection wherein the end projections are arranged in spaced apart juxtaposed position when the first and second arcuate jaws are in their closed position and wherein the jaw fastener includes an elongated shaft axially retained at one end with respect to the other end projection yet free for limited rotation to allow the elongated shaft of the jaw fastener to pass through an aperture formed in one of the projections during movement of the first and second arcuate jaws between open and closed positions.

Still another object of this invention is to provide a coupling as defined above wherein said elongated shaft is threaded at its distal end and the jaw fastener includes a threaded nut having mating threads to cause the first and second arcuate jaws to be pulled into their closed position upon rotation in one direction of the threaded nut and to move toward their open position upon rotation in an opposite direction of the threaded nut.

Another object of this invention is to provide a coupling as described above wherein the elongated shaft includes a head and one end projection of an arcuate jaw includes a retaining tab for engaging the head to limit axial movement of the elongated shaft while permitting limited rotational movement of the elongated shaft when the first and second arcuate jaws are moved between open and closed positions.

A more specific object of this invention is to provide a coupling as described above wherein the end projections are curved back toward the first and second arcuate jaws, respectively, such that the distal ends of the end projections may be affixed to the first and second arcuate jaws, respectively, to form closed loops for retaining the head and the threaded element of the jaw fastener to thereby aid in simplifying the assembly process.

Another more specific object is to provide a coupling as described above wherein the end projection which retains the threaded element contains a second aperture through which the elongated shaft extends.

Yet another object is to provide a coupling as described above wherein the head of the elongated shaft includes a pair of radial head projections extending radially with respect to the central axis of the elongated shaft, and wherein the one end projection of the arcuate jaw to which the elongated shaft is axially affixed contains depressions on opposite sides of the first aperture to receive the radial head projections in an orientation to permit limited rotation of the elongated shaft in the same plane as the plane of rotational of the first and second arcuate jaws. The elongated shaft may be a T-bolt and the elongated shaft may be mounted to be free to rotate toward the hinge connection by an arcuate distance that is at least great enough to permit its distal end to enter the first aperture as the arcuate jaws are moved from their fully open position toward their fully closed position and to rotate away from the hinge connection as the arcuate jaws continue to move to their fully closed position.

It is another object of the disclosed invention to provide a coupling as defined above, wherein the first and second arcuate jaws are formed of stamped sheet metal having a material thickness of approximately 1.0 to 4.0 millimeter, and wherein the sidewalls of the arcuate jaws extend from the hinge connection to the end projection of each arcuate jaw.

Another object is to provide a coupling as described above, wherein the sidewalls extend around-the entire perimeter of each end projection and join together at the distal end of each end projection to form a single continuous reinforcing wall extending along substantially the entire length of each said arcuate jaw and wherein the sidewalls of the first arcuate jaw are flared out to form a lateral enlargement in the axial direction of the first arcuate jaw adjacent the opening to allow the dimension of the opening in the axial direction to be equal substantially to the axial width of the peripheral wall of the second arcuate jaw and still further wherein the extension of the second arcuate jaw has substantially the same axial width as said opening contained in the first arcuate jaw.

Yet another object is to provide a coupling as described above including a threaded nut permanently affixed to one of the end projections and further including a threaded bolt extending through the other end projection for engagement with the threaded nut to retain the arcuate jaws in their closed position wherein the bolt includes an unthreaded, reduced diameter distal end to provide self piloting during the assembly process and wherein the side walls of the arcuate jaws are interrupted at about their mid points to provide added flexibility to allow the coupling to adjust to irregularities and misalignments of the assembled components.

Still other and more specific objects of this invention may be understood from the following Brief Summary of the Drawings and Detailed Description of the Invention.

BRIEF SUMMARY OF THE DRAWINGS

FIG. 11 is a front elevational view of the second arcuate jaw forming the coupling of FIG. 5.

FIG. 12 is a side elevational view of the arcuate jaw of FIG. 11.

FIG. 13 is a cross-sectional view of the arcuate jaw of FIG. 11 taken along lines 13—13 of FIG. 12.

FIG. 14 is a cross-sectional view of the arcuate jaw of FIG. 11 taken along lines 14—14 of FIG. 11.

FIG. 15 is a top elevation of a T-bolt for use as a fastener in the coupling of FIGS. 5–14.

FIG. 16 is a side elevational view of the T-bolt of FIG. 15.

FIG. 17 is a broken away side elevational view of an alternative fastener for pulling the arcuate jaws together.

DETAILED DESCRIPTION OF THE INVENTION

Figure 1:
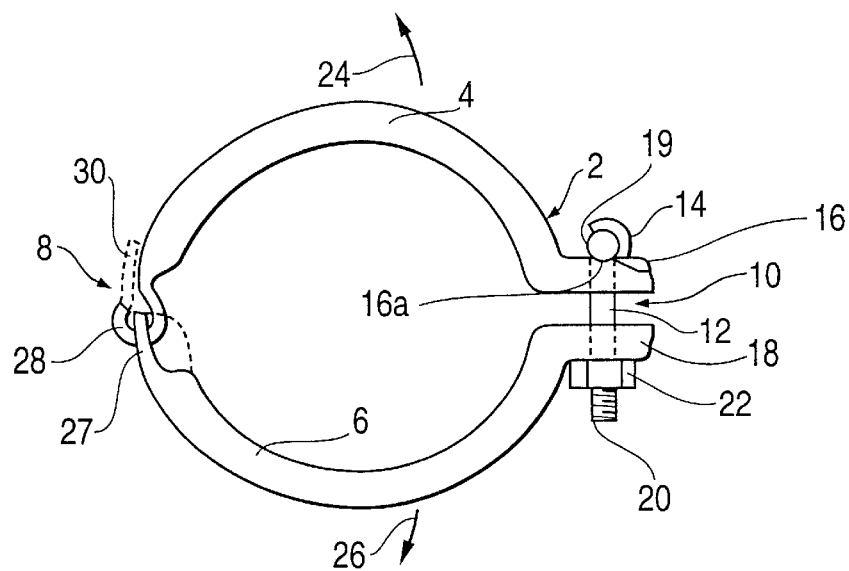
FIG. 1 is a front elevational view of a coupling formed in accordance with the subject invention.

Reference is now made to FIG. 1 wherein a coupling 2 designed in accordance with the subject invention is illustrated including a first arcuate jaw 4 rotatably connected at one end to a second arcuate jaw 6 by a hinge connection 8. Each arcuate jaw contains a radially inwardly opening groove (not illustrated in FIG. 1) for receiving arcuate portions, respectively, of the juxtaposed radial flanges of the flanged elements as will be discussed more fully below. Jaws 4 and 6 are interconnected at their opposite ends by a jaw fastener 10 that may take a variety of different forms. The first arcuate jaw 4 includes a radially outwardly extending first projection 16 and the second arcuate jaw 6 includes a second projection. 18 extending radially outwardly in spaced apart juxtaposition as illustrated in FIG. 1.

As further illustrated in FIG. 1, fastener 10 includes a threaded T-bolt 12 retained at one end by a tab 14 formed in the first projection 16 that is designed to retain the T-bolt 12 in a relative fixed axial position. The second projection 18 contains an aperture through which the elongated shaft of the T-bolt extends. The head 19 of the T-bolt is cylindrical in shape and has a central axis arranged perpendicularly to the central axis of a cylindrical elongated shaft 20 of the T-bolt. First projection 16 includes a slight depression 16a arranged to orient the head 19 of the T-bolt as illustrated in FIG. 1. The retaining tab 14 is arranged to retain the central axis of the head 19 of the T-bolt perpendicular to the plane of rotation of the rotatably connected arcuate jaws to allow the T-bolt limited rotational movement within the plane of rotation of the arcuate jaws 4 and 6. The elongated shaft 20 of the T-bolt 12 is threaded 20 to receive a nut 22 with complementary threads for applying a closing force to the first and second arcuate jaws to pull the jaws into their closed position, illustrated in FIG. 1, upon rotation of the nut in one direction. Rotation of nut 22 in the opposite direction permits the arcuate jaws 4 and 6 to rotate, as illustrated by arrows 24 and 26, toward an open position. The limited rotational movement of T-bolt within the plane of rotation of the arcuate jaws permitted by tab 14 greatly assists in the ease with which the coupling of the present invention may be installed during an assembly process and therefor is able to reduce the costs of manufacture of products such as turbo-chargers where couplings are used to join flanged elements together.

Another feature of the subject invention is the simple, yet extremely strong, hinge connection 8 illustrated in FIG. 1. The reliable strength of this connection is important to forming an acceptable coupling since the coupling must be capable of withstanding very substantial circumferential forces imparted to the arcuate jaws as the threaded nut of the jaw fastener 10 is rotated to pull the arcuate jaws into their fully closed position. As will be discussed further, the arcuate jaws are formed to engage the juxtaposed radial flanges of flanged elements, such as pipes or turbo-charger components, in a manner to cause the flanges to be axially biased toward one another as the arcuate jaws are moved to their closed position. To form a reliable joint between the elements, which in many instances requires the joint to be fluid tight, the axial biasing force will often need to be quite substantial which, in turn, requires the circumferential force imposed on the arcuate jaws to be quite large. Such a circumferential force imposes stringent strength requirements on hinge joint 8. On the other hand the design needs to be inexpensive to manufacture in order to be commercially acceptable.

The present design solves these conflicting requirements by providing an extremely simple yet high strength hinge connection. More particularly, the hinge connection includes an opening 27 integrally formed at the end of the second arcuate jaw 4 opposite the second end projection 18. The hinge connection also includes an integral extension 28 formed at the end of the first arcuate jaw 4 opposite the first end projection 16. Extension 28 extends through opening 27 and back to the first arcuate jaw 4 where the distal end 30 of extension 28 may be affixed to the first arcuate jaw 4 is some fashion such as by welding (that is arc, friction, ultrasonic or other type welding) or by a fastener (such as rivet, bolt or other type fastener) to form a closed loop pivot.

Figure 2:
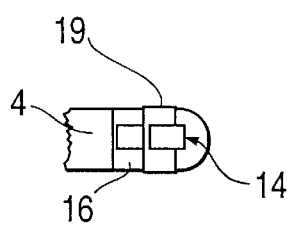
FIG. 2 is a partially broken away top elevational view of an end projection of one of the arcuate jaws forming the coupling of FIG. 1 wherein the end projection is adapted to support a fastener for the closure of the coupling of FIG. 1.

FIG. 2 is a broken away, top elevational view of first projection 16 formed at one end of arcuate jaw 4. In this view, retaining tab 14 is shown as being formed out of the same material of which the jaw is formed. In particular, retaining tab 14 may be pierced out of the first end projection 16 as illustrated in FIG. 2 wherein the central axis of the cylindrical head 19 is shown oriented perpendicularly with respect to the plane in which the first and second arcuate jaws 4 and 6 rotate about the pivot axis formed by the hinge connection 8. Stated in another way, the central axis of cylindrical head 19 is parallel with the pivot axis formed by the hinge connection 8.

Figure 3:
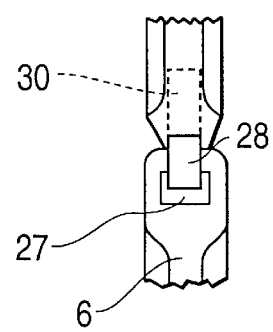
FIG. 3 is a partially broken away side elevational view of a hinge connection which pivotally joins the pair of arcuate jaws forming the coupling of FIG. 1.

FIG. 3 is a broken away, side elevational view of the hinge connection 8. In particular, FIG. 3 shows more clearly that the opening 27 is formed in an end portion of second arcuate jaw 6 that has been flattened out some what to allow the width of the opening 27 (measured in the direction of the pivot axis formed by hinge connection 8) to be relatively wide and equal at least to the width of the radially inwardly opening groove formed in the first and second arcuate jaws 4 and 6.

Figure 4:
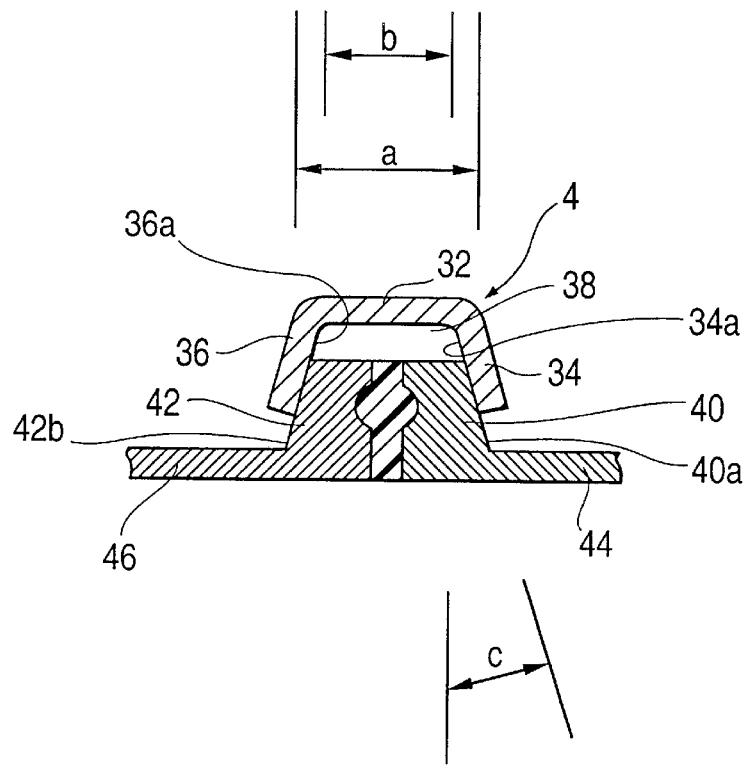
FIG. 4 is a partially broken away cross-sectional view of a coupling designed in accordance with the subject invention employed to apply axial force to a pair of elements having juxtaposed radial flanges engaged by the arcuate jaws of the coupling.

FIG. 4 is a broken away, cross-sectional view of one of the arcuate jaws (for example first arcuate jaw 4) as it would appear in its operative position. As is more apparent in FIG. 4, the arcuate jaw 4 may include an arcuate peripheral wall and a pair of radially inwardly directed side walls 34 and 36 connected to the arcuate peripheral wall 32 to form the inwardly opening groove 38. Received within groove 38 are a pair of juxtaposed radial flanges 40 and 42 of elements 44 and 46, respectively. Elements 44 and 46 may be pipes, tubes, or conduits or may be portions of a turbo-charger such as a turbo-charger end housing and a turbo-charger center (or bearing) housing or a turbine housing and an exhaust outlet connection. The side walls 34 and 36 have inner surfaces 34a and 36a defining the axial boundaries of the radially inwardly opening groove 38, wherein the inner surfaces 34a and 36a are oriented to cause the axial distance "a" separating the inner surfaces 34a and 36a to be greater at the mouth of the groove as compared with the axial distance "b" separating the inner surfaces at the base adjacent the peripheral wall 32, whereby the inner surfaces 34a and 36a are arranged to contact the radial flanges 40 and 42 of the flanged elements 44 and 46 to impart an axial biasing force to the flanged elements of sufficient magnitude to create an acceptable axial joint between elements 44 and 46. As illustrated in FIG. 4, a seal 48 may be placed between radial flanges 40 and 42 to cause the seal 48 to be axially squeezed as arcuate jaws 4 and 6 are moved toward their closed positions. The degree to which side walls 34 and 36 are angularly flared in opposite axial directions can be measured by the angle "c" shown in FIG. 4. Angle "c" is the angle formed by the intersection of each side wall's inner surface when cut by the cross-sectional plane as illustrated in FIG. 4 relative to the perpendicularly oriented plane in which the arcuate jaws rotate. In one embodiment "c" was selected to be approximately 20° but may range from 15° to 30°. Angle "c" on arcuate jaws 4 and 6 may be less than or more than angle "c" on flanges 40 and 42 in order to impart a circumferential line contact at the major or minor diameter of the clamp to flange joint. On some applications, this circumferential line contact improves the clamp load distribution around the joint circumference. In one embodiment this difference in angle "c" was selected to be approximately 1.5° but may range from 0° to 5°. Alternatively, side walls 34 and 36 may be oriented perpendicularly to the axial direction such that "a" equals "b". In this case the distal ends of the side walls 34 and 36 would make arcuate lines of contact with flanges 40 and 42, respectively. In yet another alternative the contacting faces 40a and 42a of flanges 40 and 42 could be oriented radially in which case the arcuate lines of contact with side walls 34 and 36 would be formed at the radial extremities (distal ends) of flanges 40 and 42. The coupling of FIGS. 1–5 may be stamped from sheet stock material such as stainless steel or other type of sheet steel.

Figure 5:
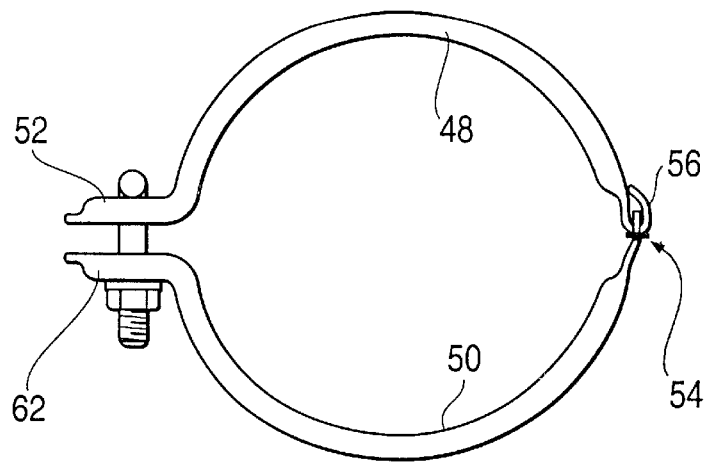
FIG. 5 is a side elevational view of an alternative embodiment of a coupling formed in accordance with the subject invention.

Reference is now made to FIG. 5 wherein another embodiment of the subject invention is disclosed. In this embodiment, arcuate jaws 48 and 50 are similar to arcuate jaws 4 and 6 except first end projection 52 of arcuate jaw 48 does not include a retaining tab. The hinge connection 54 has been modified relative to the design illustrated in FIG. 1 wherein the width of the end portion of arcuate jaw 50 containing the opening for receiving the extension 56 of arcuate jaw 48 has been widened as will be discussed below to increase the strength of the hinge connection.

Figure 6:
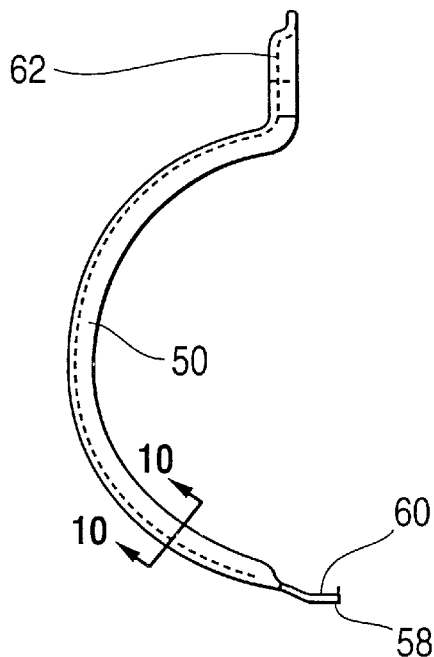
FIG. 6 is a front elevational view of one of the arcuate jaws forming the coupling as illustrated in FIG. 5.
Figure 7:
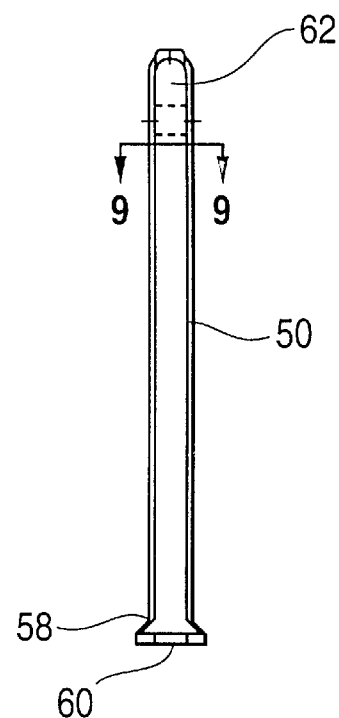
FIG. 7 is a side elevational view of the arcuate jaw of FIG. 6.
Figure 8:
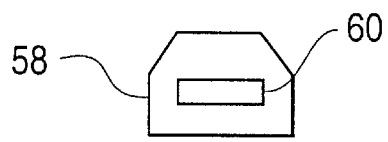
FIG. 8 is a partially broken away view of the apertured end of one of the arcuate jaws of the coupling of FIGS. 6 and 7.

FIGS. 6 and 7 illustrate elevational views of arcuate jaw 50 of FIG. 5. As is particularly evident in FIG. 7, the end portion 58 of second arcuate jaw 50 is considerably wider that the axial width of the remaining portion of the second arcuate jaw 50. This arrangement allows for a wider opening 60 in end portion 58, as illustrated in FIG. 8, which in turn allows the extension 56 of the first arcuate jaw 48 to be wider thereby resulting in a stronger hinge connection.

Figure 10:
FIG. 10 is a cross sectional view of the arcuate jaw illustrated in FIG. 7 taken along lines 10—10.
Figure 9:
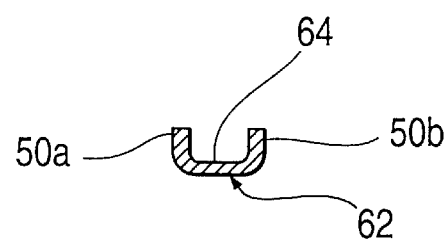
FIG. 9 is a cross sectional view of the arcuate jaw illustrated in FIG. 7 taken along lines 9—9.

FIG. 9 is a cross-sectional view of arcuate jaw 50 taken along lines 9—9 of FIG. 7 which demonstrates that the side walls 50a and 50b in the region of the radially directed second end projection 62 are generally perpendicular to the peripheral wall 64 in the second end projection 62. In contrast, FIG. 10 is a cross-sectional view of arcuate jaw 50 taken along lines 10—10 of FIG. 6 wherein side walls 50a and 50b are shown axially flared by an angle of 20°. This orientation of side walls 50a and 50b extends over the full arcuate length of arcuate jaw 50 except for the first projection 52, and second projection 62.

FIGS. 11, 12, 13 and 14 illustrate views of arcuate jaw 48 that correspond with the views of arcuate jaw 50 in FIGS. 6, 7, 9 and 10, respectively. Attention is particularly directed to FIG. 12 wherein extension 56 is illustrated as having an axial width substantially equal to the axial width of arcuate jaw 50. This added width provides greater strength to the hinge connection.

FIGS. 15 and 16 disclose top and side views of a T-bolt (such as T-bolt 12) of the type used in the couplings of FIGS. 1 and 5.

FIG. 17 illustrates an alternative to the radial end projections 16 and 18 of FIG. 1. In particular, the radial end projections are formed with substantially increased radial length sufficient to allow the end projections 64 and 66 to be bent backward and attached at their distal ends 68 and 70, respectively, to arcuate jaws 72 and 74. The resulting loops form pockets 76 and 78 for retaining socket head 80 and square nut 82 of the bolt 84 to assist in retaining the bolt and nut during assembly of the coupling onto a pair of flanged elements to form a suitable joint between the flanges. End projection 66 contains an opening 67 through which the end of 84 is allowed to extend.

Figure 18:
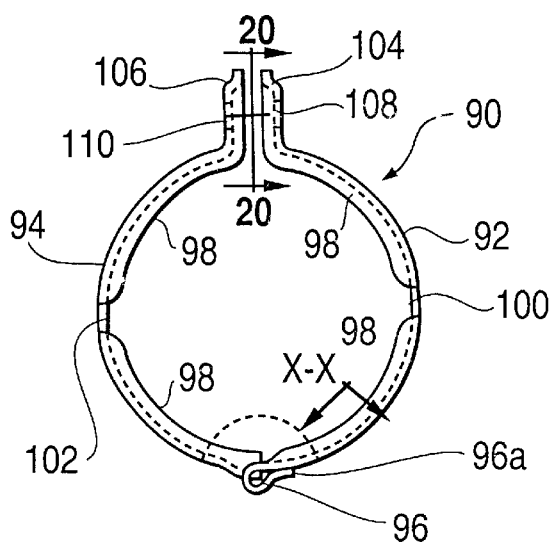
FIG. 18 is a side elevational view of yet another alternative embodiment of a coupling formed in accordance with the subject matter.

FIG. 18 discloses yet another embodiment of a coupling 90 designed in accordance with the subject invention. Coupling 90 includes arcuate jaws 92 and 94, corresponding to jaws 48 and 50, except that the distal end 96a of extension 96, of arcuate jaw 92 is attached, such as by welding, to arcuate jaw 92. In addition arcuate jaws 92 and 94 have a first side walls 98 corresponding to side wall 34 and opposed side walls (not illustrated) corresponding to side wall 42. The side walls of the FIG. 18 embodiment are interrupted at points 100 and 102 which is about 90° from the respective ends of arcuate jaws 92 and 94. This interruption provides additional flexibility to the jaws to allow them to mate more evenly with the juxtaposed radial flanges (not illustrated) of the pipes, tubes or conduits that are being joined by the coupling 90. This flexibility allows the arcuate jaws to accommodate more easily any irregularity in the configuration of the arcuate jaws and/or misalignment/irregularity in the radial flanges that are being joined by the coupling.

Jaws 92 and 94 include a radially oriented first end projection 104 and a radially oriented second end projection 106 containing opposed holes 108 and 110 respectively for receiving a fastener, such as a bolt.

Figure 19:
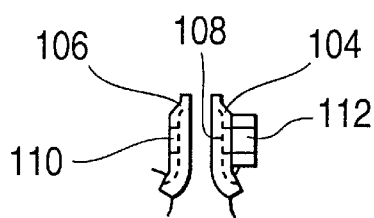
FIG. 19 is a cut away view of the first and second projections at the ends of the arcuate jaws of the coupling illustrated in FIG. 18.
Figure 20:
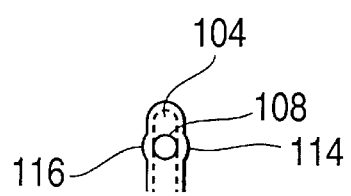
FIG. 20 is an elevational view of projections at one end of an arcuate jaw taken along lines 20—20 of FIG. 18.

As illustrated in FIG. 19, first projection 104 may have a threaded nut 112 attached thereto by, for example, welding, so that the threaded opening of the nut 112 is aligned with openings 108 and 110. FIG. 20 is an elevational view of first end projection 104 taken along lines 20—20 of FIG. 18. This view shows that the side walls of arcuate jaw 92 contain flared out portions 114 and 116 on opposite sides of hole 108 to allow a larger diameter hole to be formed in projection 104 and thus the flared portions 114 and 116 allow the coupling to accommodate a larger bolt. The flared portions 114 and 116 also add strength to the first end projection 104. Similar opposed flared portions are formed in the side walls of the second arcuate jaw on opposed sides of opening 110.

Figure 21:
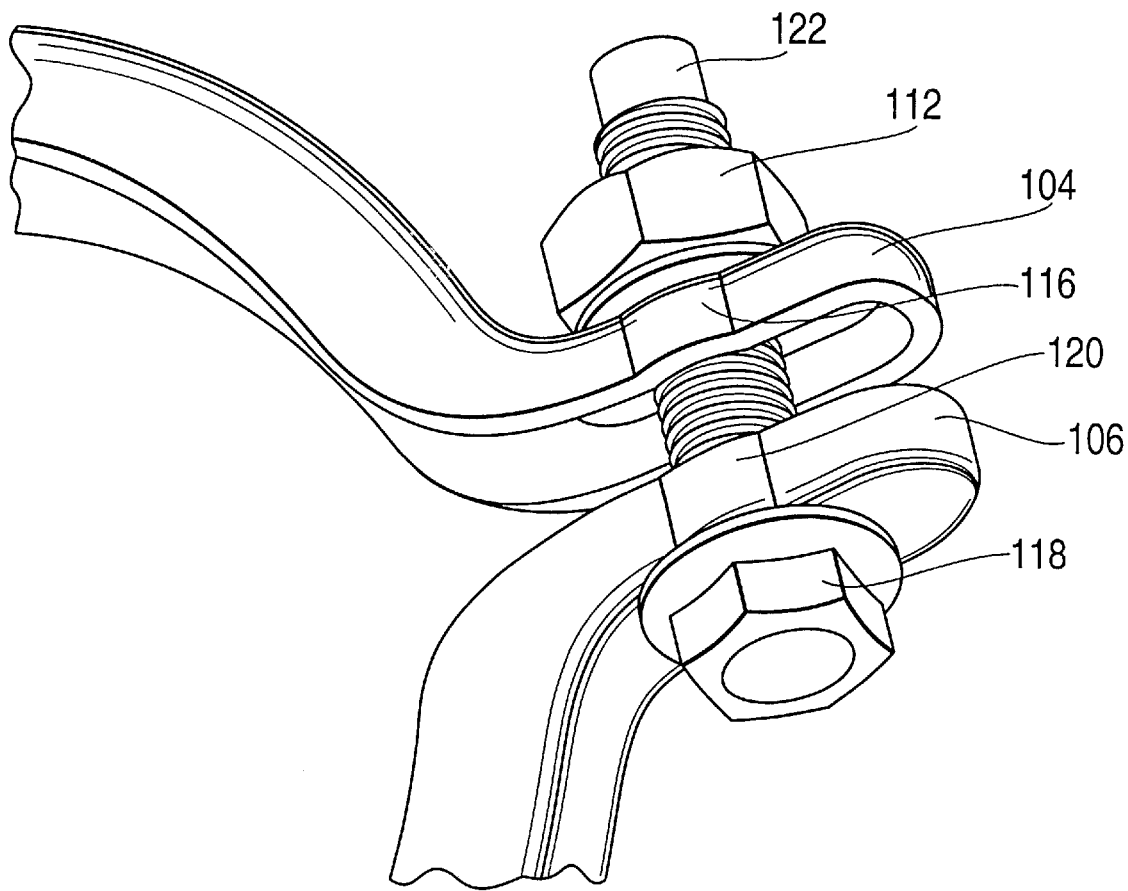
FIG. 21 is a cutaway perspective view of the coupling of FIG. 18 wherein the arcuate jaws are being held in their closed position by a threaded bolt.

Reference is now made to FIG. 21 wherein opposed first end projection 104 and second end projection 106 are illustrated in an operative position with a fastening bolt 118 placed through openings 108 and, 110 and in threaded engagement with threaded nut 112. FIG. 21 illustrates how flared portions II 6 and the opposed flared portion 120 formed in second end projection 106 are formed to accommodate a larger diameter bolt 118 than would otherwise be possible if the side walls were not flared outwardly.

Bolt 118 includes an unthreaded reduced diameter portion 122 at its distal end to provide a piloting function for bolt 118 as the first and second arcuate jaws are moved from their open position (in which they may be placed around a pair of radial flanges that are to be coupled) toward their closed position, as illustrated in FIG. 21. In particular, during the assembly process, bolt 118 may be inserted through opening 110 while the jaws are in their open position. As the arcuate jaws are moved toward their closed position, in which the inwardly opening grooves are caused to receive arcuate portions of a pair of radial flanges, not illustrated, the reduced diameter portion 112 of bolt 118 may be easily directed through opening 108 and into the threaded opening of nut 112. The unthreaded, reduced diameter portion 122 imparts a self piloting function to bolt 118 to facilitate the assembly process.

INDUSTRIAL APPLICABILITY

A coupling has thus been disclosed that has particular utility as a coupling for joining together turbo-charger components. The coupling has features that make it particularly useful for joining pipes, hoses, tubes, and other types of conduits having mating radial flanges. The disclosed coupling is particularly adapted for use as a coupling for joining components being assembled during a high production, assembly line process where low cost, speed of assembly, and reliability in operation are critical attributes.

We claim:

1. A coupling for releasably joining a pair of flanged elements having juxtaposed radial flanges, comprising
    a. first and second arcuate jaws containing first and second radially inwardly opening grooves, respectively, for receiving first and second arcuate portions, respectively, of the juxtaposed radial flanges of the flanged elements, said arcuate jaws being movable from an open position toward a closed position to impart opposed axial forces to the juxtaposed radial flanges to bias the pair of flanged elements toward one another, said second arcuate jaw containing an opening adjacent one end of said first arcuate jaw;
    b. a hinge connection for hingedly joining said one end of said first arcuate jaw to one end of said second arcuate jaw to cause said first and second arcuate jaws to rotate relative to one another as said arcuate jaws are moved between said open and closed positions; and
    c. a coupling for causing said first and second jaws to be held in the closed position in which the flanged elements are biased together with a desired amount of axial force;

wherein said hinge connection includes an extension integrally formed at said one end of said second arcuate jaw and extends through said opening and back to said second arcuate jaw where the distal end of said extension is affixed to said second arcuate jaw to form a closed loop pivot for said hinge connection.

2. The coupling as defined in claim 1, wherein each of said first and second arcuate jaws includes an arcuate peripheral wall and a pair of radially inwardly directed side walls connected to said arcuate peripheral wall to form said inwardly opening grooves, respectively, and said side walls having inner surfaces defining the axial boundaries of said radially inwardly opening grooves, said inner surfaces being arranged to contact the radial flanges of the flanged elements to impart the axial biasing force to the flanged elements.

3. The coupling as defined in claim 2, wherein said inner surfaces are flared to cause the axial distance separating each pair of inner surfaces to be greater at the mouth of the groove as compared with the axial distance separating said inner surfaces at the base adjacent said peripheral wall.

4. The coupling as defined in claim 2, wherein each said arcuate jaw includes radially outwardly extending first and second end projections, respectively, said end projections being arranged in spaced apart juxtaposed position when said first and second arcuate jaws are in their closed position, wherein one of said end projections contains an aperture and wherein said coupling includes an elongated shaft axially retained at one end with respect to the other said end projection yet free for limited rotation to allow said elongated shaft to extend through said aperture during movement of said first and second arcuate jaws between open and closed positions.

5. The coupling as defined in claim 4, wherein said elongated shaft is threaded at its distal end and said coupling includes a threaded element having mating threads to cause said first and second arcuate jaws to be pulled into their closed position upon rotation in one direction of the threaded element and to move toward their open position upon rotation in an opposite direction of the threaded element.

6. The coupling as defined in claim 5, wherein said elongated shaft includes a head and said one end projection includes a retaining tab for engaging said head to limit axial movement of said elongated shaft while permitting limited rotational movement within a plane perpendicular to the axial direction of the coupling.

7. The coupling as defined in claim 5, wherein said end projections are curved back toward said first and second arcuate jaws, respectively, the distal ends of said end projections being affixed to said first and second arcuate jaws, respectively, to form closed loops for retaining said head and said threaded element respectively.

8. The coupling as defined in claim 7, wherein said end projection which retains said threaded element contains a second aperture through which said elongated shaft extends.

9. The coupling as defined in claim 8, wherein said head of said elongated shaft includes a pair of radial head projections extending radially with respect to the central axis of said elongated shaft, and wherein said one end projection contains depressions on opposite sides of said first aperture to receive said radial head projections in an orientation to permit limited rotation of said elongated shaft in the same plane as the plane of rotational of said first and second arcuate jaws.

10. The coupling as defined in claim 4, wherein said elongated shaft is free to rotate toward said hinge connection by an arcuate distance that is at least great enough to permit its distal end to enter said first aperture as said arcuate jaws are moved from their fully open position toward their fully closed position and to rotate away from said hinge connection as said arcuate jaws continue to move to their fully closed position.

11. The coupling as defined in claim 2, wherein said first and second arcuate jaws are formed of stamped sheet metal having a thickness of approximately 1.0 to 4.5 mm, and wherein said sidewalls extend from said hinge connection to said end projection of each arcuate jaw.

12. The coupling as defined in claim 11, wherein said sidewalls extend around the entire perimeter of each end projection and join together at the distal end of each end projection to form a single continuous reinforcing wall extending along substantially the entire length of each said arcuate jaw.

13. The coupling as defined in claim 12, wherein said sidewalls of said first arcuate jaw are flared out to form a lateral enlargement in the axial direction of said first arcuate jaw adjacent said opening to allow the dimension of said opening in the axial direction to be equal substantially to the axial width of said peripheral wall of said second arcuate jaw.

14. The coupling as defined in claim 13, wherein said extension of said second arcuate jaw has substantially the same axial width as said opening.

15. The coupling as defined in claim 9, wherein said elongated shaft is a T-bolt.

16. The coupling as defined in claim 3, wherein the angle at which said inner surfaces are flared ranges from 15° to 30°.

* * * * *